United States Patent
Liang

(10) Patent No.: US 8,588,775 B2
(45) Date of Patent: Nov. 19, 2013

(54) MOBILE COMMUNICATION SYSTEM AND RELATED MANAGEMENT METHOD

(75) Inventor: Wei-Kuo Liang, Taipei Hsien (TW)

(73) Assignee: Wistron Corporation, Hsichih, New Taipei (TW)

( * ) Notice: Subject to any disclaimer, the term of this patent is extended or adjusted under 35 U.S.C. 154(b) by 734 days.

(21) Appl. No.: 12/465,653

(22) Filed: May 14, 2009

(65) Prior Publication Data

US 2010/0035612 A1 Feb. 11, 2010

(30) Foreign Application Priority Data

Aug. 7, 2008 (TW) .............................. 97130020 A

(51) Int. Cl.
*H04W 4/00* (2009.01)
*H04M 1/00* (2006.01)

(52) U.S. Cl.
USPC ................. 455/435.1; 455/432.1; 455/456.1

(58) Field of Classification Search
USPC ...................................................... 455/435.1
See application file for complete search history.

(56) References Cited

U.S. PATENT DOCUMENTS

| | | | |
|---|---|---|---|
| 5,274,845 A | 12/1993 | Wang | |
| 6,714,799 B1 | 3/2004 | Park et al. | |
| 7,289,805 B2 * | 10/2007 | Tom et al. | 455/432.1 |
| 2004/0142689 A1 * | 7/2004 | Boda | 455/432.1 |
| 2006/0121904 A1 * | 6/2006 | Reuhkala et al. | 455/445 |
| 2006/0205434 A1 * | 9/2006 | Tom et al. | 455/558 |
| 2006/0276226 A1 * | 12/2006 | Jiang | 455/558 |
| 2007/0287475 A1 * | 12/2007 | Jeong et al. | 455/456.6 |
| 2009/0061860 A1 * | 3/2009 | Jiang | 455/433 |
| 2010/0048197 A1 * | 2/2010 | Jiang | 455/422.1 |
| 2010/0246500 A1 * | 9/2010 | Rydnell et al. | 370/329 |

FOREIGN PATENT DOCUMENTS

| | | |
|---|---|---|
| CN | 1075836 A | 9/1993 |
| CN | 1253439 A | 5/2000 |
| CN | 101083620 A | 12/2007 |

OTHER PUBLICATIONS

Office action mailed on Oct. 18, 2011 for the China application No. 200810210970.9, p. 3 line 4-17, p. 4 line 8-16 and line 19-30 and p. 5 line 1 as well as line 19-25.

* cited by examiner

*Primary Examiner* — Huy C Ho
(74) *Attorney, Agent, or Firm* — Winston Hsu; Scott Margo

(57) ABSTRACT

The present invention discloses a mobile communications system, which includes a mobile communication device and a server device. The mobile communication device includes a first reception module for obtaining device information corresponding to the mobile communication device and a transmission module for transmitting the device information via a mobile communication network. The server device includes a second reception module for receiving the device information via the mobile communication network and a connection module for establishing a communication connection between the mobile communication device and a destination end according to the device information when a communication request corresponding to the mobile communication device is received from the destination end.

18 Claims, 7 Drawing Sheets

MOBILE COMMUNICATION SYSTEM AND RELATED MANAGEMENT METHOD

BACKGROUND OF THE INVENTION

1. Field of the Invention

The present invention relates to a mobile communication system and related management method, and more particularly, to a mobile communication system and related management method for effectively reducing a phone expense, and immediately and smoothly contacting a related user.

2. Description of the Prior Art

Along with the globalization concept unceasing development, more and more enterprises establish transnational organizations to reduce production cost, or provide customer transnational services. In this kind of enterprise, a way of contact with staffs is often a topic. For example, in FIG. 1, if a transnational enterprise has offices or factories in locations NT1 (such as United States) and NT2 (such as Germany), when a staff EP1 in the location NT1 brings a mobile phone MB (which has a subscriber identity model card SIM1 corresponding to a phone number NB1) to the location NT2, there are many situations if a staff EP2 in location NT1 wants to contact with the staff EP1.

Please refer to FIG. 2, which is a tree diagram 20 for illustrating different situations of the staff EP2 contacting with the staff EP1 in FIG. 1. The tree diagram 20 is started with Step 200, and has five branches BR1~BR5 which means five possible results. Step 200 can be divided into three situations when the staff EP2 wants to contact with the staff EP1. The first situation is corresponding to the branch BR1, which includes the following steps:

Step A: The subscriber identity model card SIM1 can roam in the location NT2, and the staff EP1 already installs the subscriber identity model card SIM1 in the mobile phone MB.

Step A1: The staff EP2 dials or sends a message to the phone number NB1.

Step A2: The staff EP1 and staff EP2 both need to pay an international roaming expense.

The second situation is corresponding to the branches BR2~BR4, which includes the following steps:

Step B: The staff EP1 purchases a subscriber identity model card SIM2 which is corresponding to a phone number NB2 from a mobile phone company in the location NT2.

Step B1: The staff EP1 installs the subscriber identity model card SIM2 in the mobile phone MB.

(Blow is the Branch BR2 and BR3)

Step B2_1: The staff EP1 tells the staff EP2 the phone number NB2.

Step B3_1: The staff EP2 dials or sends a message to the phone number NB2.

Step 4_1: The staff EP2 needs to pay an international roaming expense.

Step B3_2: The staff EP2 tries to dial or send a message to the phone number NB1, and dials or sends a message to the phone number NB2 again when the phone number NB1 is unable to be connected.

Step B4_2: The staff EP2 needs to pay an international roaming expense, and spends time dialing the phone number NB1.

(Blow is the Branch BR4)

Step B2_2: The staff EP1 does not tell the staff EP2 the phone number NB2

Step B3_3: The staff EP2 dials or sends a message to the phone number NB1.

Step B4_3: The staff EP2 can not contact with the staff EP1.

The third situation is corresponding to the branch BR5, which includes the following steps:

Step C: The subscriber identity model card SIM1 cannot roam in the location NT2, and the staff EP1 does not purchase the subscriber identity model card SIM2.

Step C1: The staff EP2 dials or send a message to the phone number NB1.

Step C2: The staff EP2 can not contact with the staff EP1.

As can be seen from above, when the staff EP1 travels to the location NT2, there is a situation that the staff EP2 cannot contact with the staff EP1 immediately because the staff EP2 cannot get the contact method of the staff EP1. In addition, although the staff EP2 can contact with the staff EP1 through international roaming, whether the staff EP1 uses the subscriber identity model card SIM2 or not, at least one staff needs to pay an extra international roaming expense, which causes phone expense increasing.

SUMMARY OF THE INVENTION

It is therefore a primary objective of the claimed invention to provide a mobile communication system and related management method.

The present invention discloses a mobile communication system, which includes a mobile communication device and a server device. The mobile communication device includes a first reception module for obtaining device information corresponding to the mobile communication device, and a transmission module for transmitting the device information via a mobile communication network. The server device includes a second reception module for receiving the device information via the mobile communication network, and a connection module for establishing a communication connection between the mobile communication device and a destination end according to the device information when a communication request corresponding to the mobile communication device is received from the destination end.

The present invention further discloses a communication management method for a mobile communication system, which includes a mobile communication device and a server device. The communication management method includes the mobile communication device obtaining device information corresponding to the mobile communication device, the mobile communication device transmitting the device information to the server device via a mobile communication network, and establishing a communication connection between the mobile communication device and a destination end according to the device information when the server device receives a communication request corresponding to the mobile communication device from the destination end.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
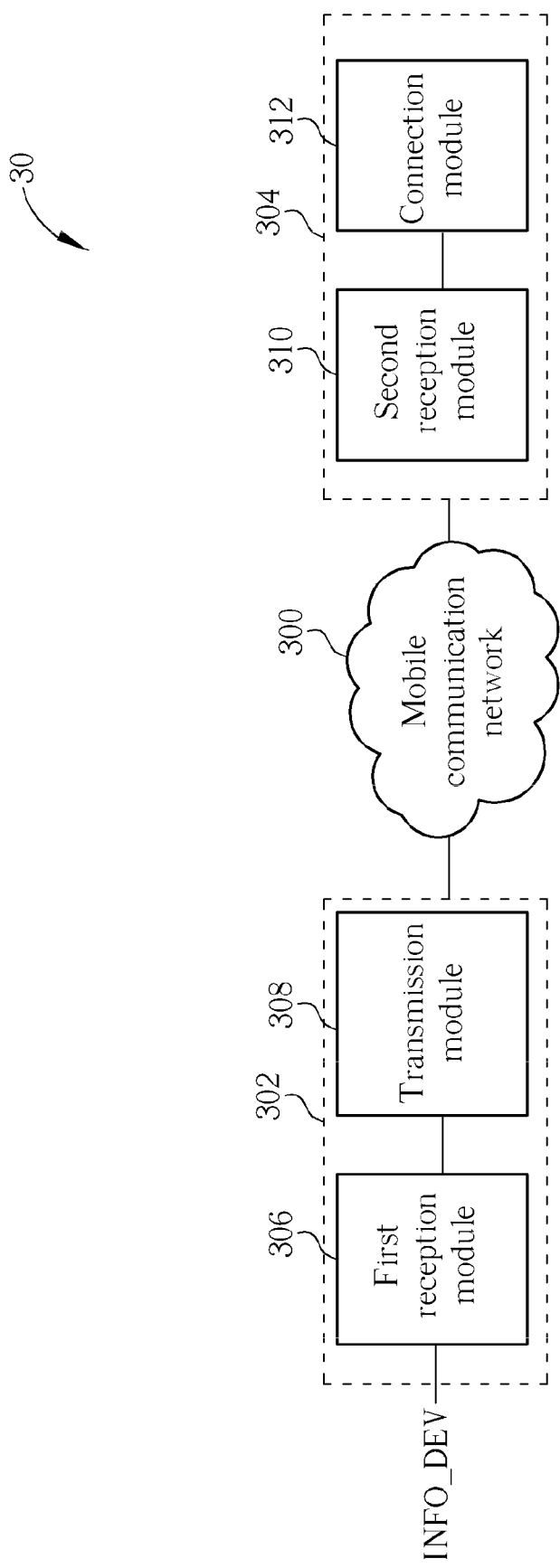
FIG. 3 is a schematic diagram of a mobile communication system according to an embodiment of the present invention.

Please refer to FIG. 3, which is a schematic diagram of a mobile communication system 30 according to an embodiment of the present invention. The mobile communication system 30 includes a mobile communication device 302 and a server device 304, which can exchange information through a mobile communication network 300. The mobile communication device 302 can be an electronic device having a mobile communication function, such as a mobile phone, a PDA, a laptop, etc, and includes a first reception module 306 and a transmission module 308. The first reception module 306 is used for obtaining device information INFO_DEV corresponding to the mobile communication device 302. The transmission module 308 is used for transmitting the device information INFO_DEV to the server device 304 via the mobile communication network 300. The server device 304 can be a server of an enterprise special use telephone system or a telecommunication service system, and includes a second reception module 310 and a connection module 312. The second reception module 310 is used for receiving the device information INFO_DEV via the mobile communication network 300, and the connection module 312 is used for establishing a communication connection between the mobile communication device 302 and a destination end according to the device information INFO_DEV when a communication request corresponding to the mobile communication device 302 is received from the destination end.

In a word, the mobile communication device 302 can transmit the device information INFO_DEV to the server device 304 through the mobile communication network 300, and the server device 304 establishes a proper communication connection according to the device information INFO_DEV. Preferably, the device information INFO_DEV includes information of the mobile communication device 302, such as location information, a phone number, and a telecommunication service provider, etc. Meanwhile, according to a user preset procure or user control signal, the transmission module 308 transmits the device information INFO_DEV timely to the server device 304 to process a corresponding work.

Note that, a designer of the mobile communication device 302 and server device 304 shall design the first reception module 306 and the connection module 312 according to the device information INFO_DEV. For example, if the device information INFO_DEV is location information of the mobile communication device 302, the first reception module 306 can be an internal or external global positioning system (GPS) receiver for obtaining the location information of the mobile communication device 302. In this situation, the connection module 312 of the server device 304 can decide a proper communication connection method according to the location information of the mobile communication device 302. For example, the connection module can include a selection unit and a connection establishment unit (not shown in FIG. 3). The selection unit selects a nearest transition point corresponding to the mobile communication device 302 according to the location information of the mobile communication device 302. Then, the connection establishment unit establishes a first communication connection between the transition point and the destination end, and a second communication connection between the transition point and the mobile communication device 302, so as to establish the communication connection between the destination end and the mobile communication device 302. In this situation, the server device 304 can reduce the phone expense through transition. Certainly, those skilled in the art can design or modify the communication connection method of the connection module 312 accordingly, and the present invention is not limited to the above-mentioned embodiment. Therefore, when the device information INFO_DEV includes the location information of the mobile communication device 302, the connection module 312 of the server device 304 decides the most suitable communication connection method according to the location of the mobile communication device 302 for conforming to different commands, such as lowering the phone expense.

In addition, if the device information INFO_DEV is a phone number of the mobile communication device 302, the first reception module can be a subscriber identity model card reader for reading the subscriber identity model card, and obtaining the phone number of the mobile communication device 302. In this situation, the connection module 312 of the server device 304 can establish the communication connection between the destination end and the mobile communication device 302 correctly according to the phone number of the mobile communication device 302. For example, the connection module 312 includes a database and an update module (not shown in FIG. 3). The database stores an original phone number or corresponding code (such as fast dial code or simple dial code) of the mobile communication device 302, and the update module updates a content stored in the database according to the phone number of the mobile communication device 302. In this situation, though the user changes the subscriber identity model card of the mobile communication device 302 (which means changing the phone number), the mobile communication device 302 keeps notifying the server device 304 of the phone number to update information of the database. Therefore, the connection module 312 can establish the communication connection between the destination end and the mobile communication device 302 when the user in the destination end dials the original phone number or the code of the mobile communication device 302. In other words, whether the user of the mobile communication device 302 tells the new phone number or not, the connection module 312 can establish the communication connection between the destination end and the mobile communication device 302 according to the phone number in the device information INFO_DEV when the user in the destination end dials the original phone number or the code of the mobile communication device 302.

Similarly, if the device information INFO_DEV is information of a telecommunication service provider corresponding to the mobile communication device 302, the connection module 312 of the server device 304 can establish the communication connection between the destination end and the mobile communication device 302 according to the telecommunication service provider of the mobile communication device 302.

Moreover, in the present invention, the mobile communication network 300 is a connection network between the mobile communication device 302 and the server device 304, and is used for transmitting the device information INFO_DEV. Note that, the connection network may be different with a communication connection network between the destination end and the mobile communication device 302. The designer of the mobile communication device 302 and server device 304 shall design the transmission module 308 and the second reception module 310 according to a type of the mobile communication network 300 or a form of the device information INFO_DEV. For example, if the form of the device information INFO_DEV is a short message or a multimedia short message and the mobile communication network 300 is a short message network or a multimedia short message network, the transmission module 308 and the second reception module 310 are a transmitter and receiver for the short message or multimedia short message. Similarly, if the form of the device information INFO_DEV is an electronic mail and the mobile communication network 300 is an electronic mail service network, the transmission module 308 and the second reception module 310 are a transmitter and receiver for the electronic mail. Preferably, in order to lower an amount of information, the transmission module 308 includes a comparator (not shown in FIG. 3) for comparing the device information INFO_DEV and original device information, so as to transmit the device information INFO_DEV or a variation between the device information INFO_DEV and the original device information to the server device 304 when the device information INFO_DEV differs from the original device information.

Figure 4:
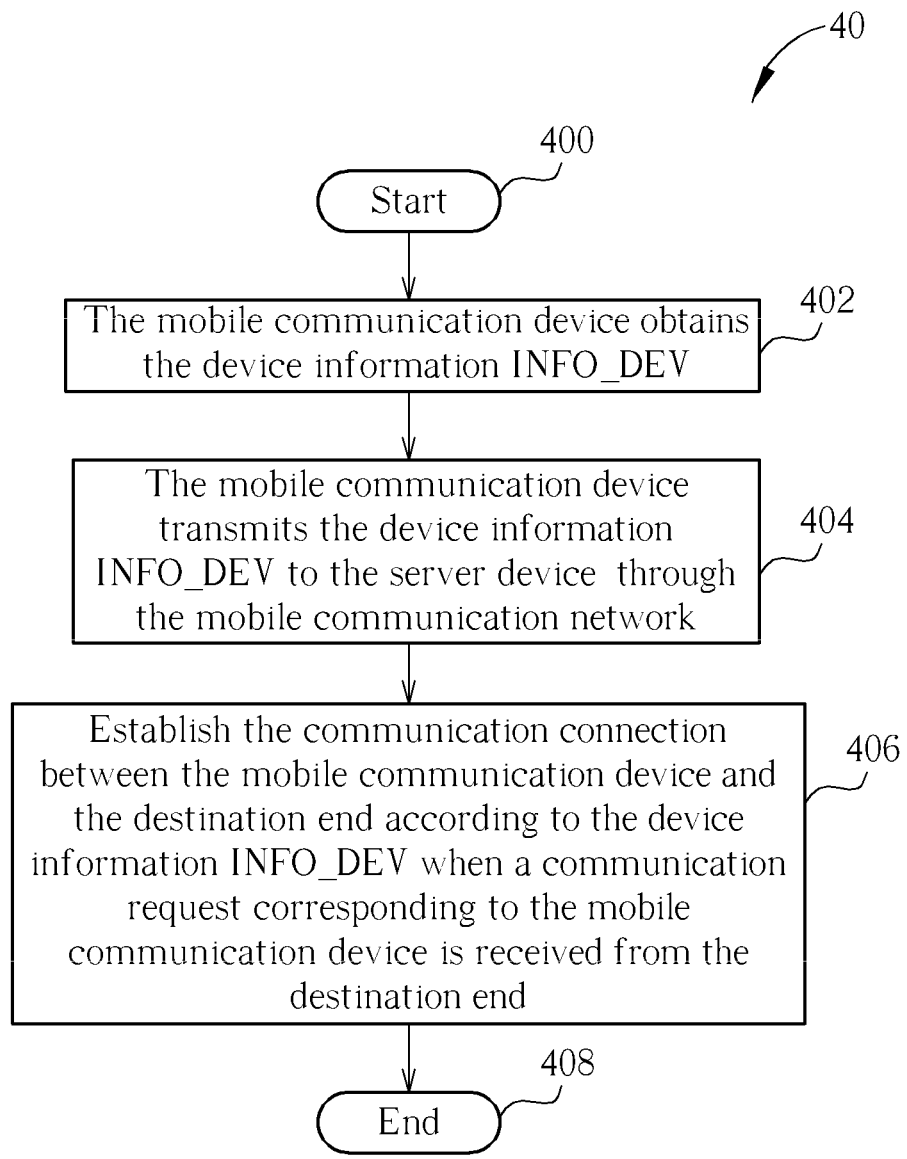
FIG. 4 is a schematic diagram of a communication management process of a mobile communication system in FIG. 3 according to an embodiment of the present invention.

In a word, the mobile communication device 302 transmits the device information INFO_DEV to the server device 304 through the mobile communication network 300, and then the server device 304 establishes a proper communication connection according to the device information INFO_DEV. The related operation process can be seen from FIG. 4, which is a schematic diagram of a communication management process 40 of the mobile communication system 30 according to an embodiment of the present invention.

The communication management process 40 includes following steps:

Step 400: Start.

Step 402: The mobile communication device 302 obtains the device information INFO_DEV.

Step 404: The mobile communication device 302 transmits the device information INFO_DEV to the server device 304 through the mobile communication network 300.

Step 406: Establish the communication connection between the mobile communication device 302 and the destination end according to the device information INFO_DEV when a communication request corresponding to the mobile communication device 302 is received from the destination end.

Step 408: End.

The operation method of the communication management process 40 has been illustrated above, so the detailed description is omitted herein.

Figure 1:
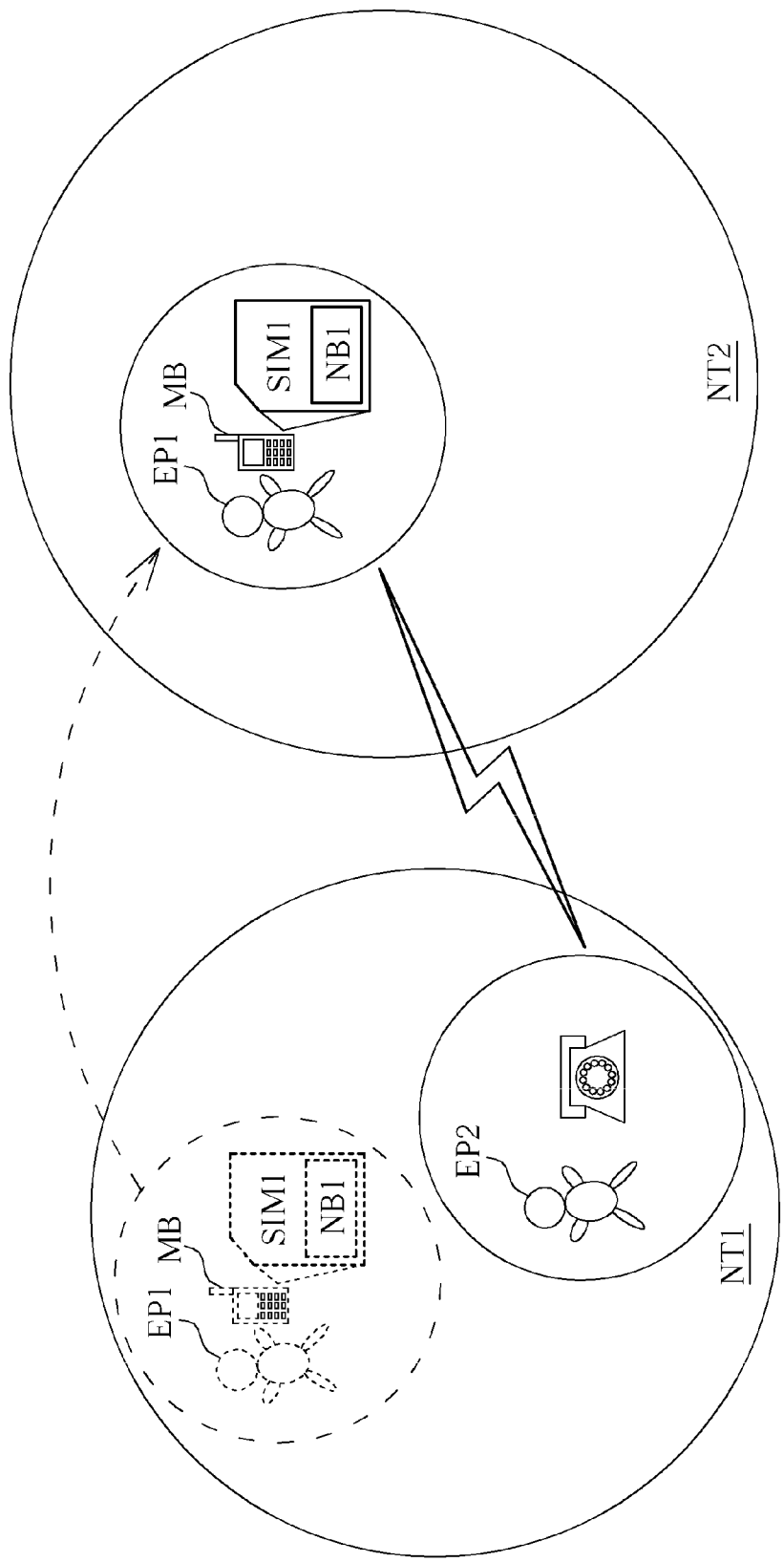
FIG. 1 is a schematic diagram of an operation of a communication system according to the prior art.
Figure 5:
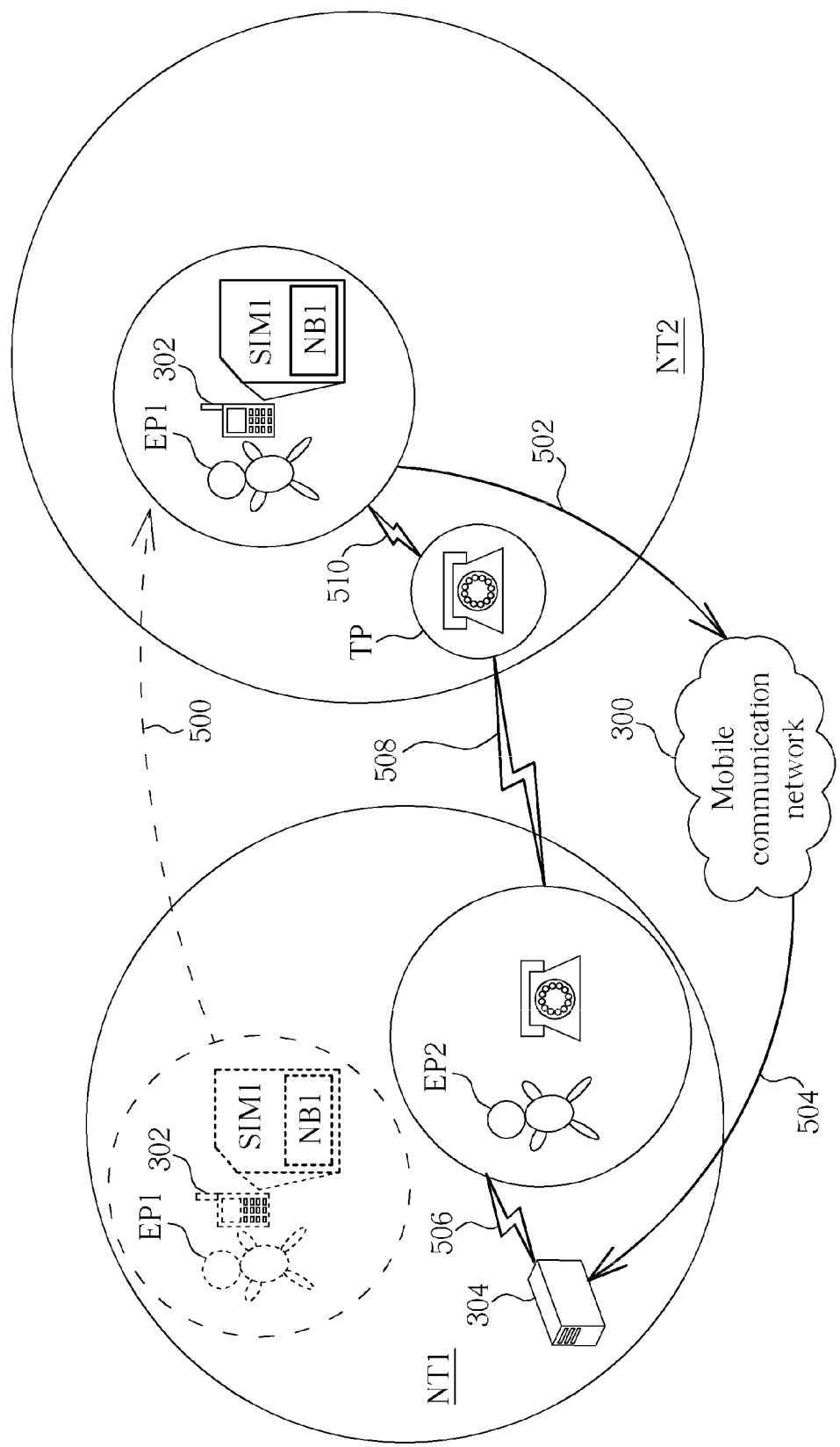
FIGS. 5, 6, and 7 are schematic diagrams of operation methods of the mobile communication system shown in FIG. 3.
Figure 6:
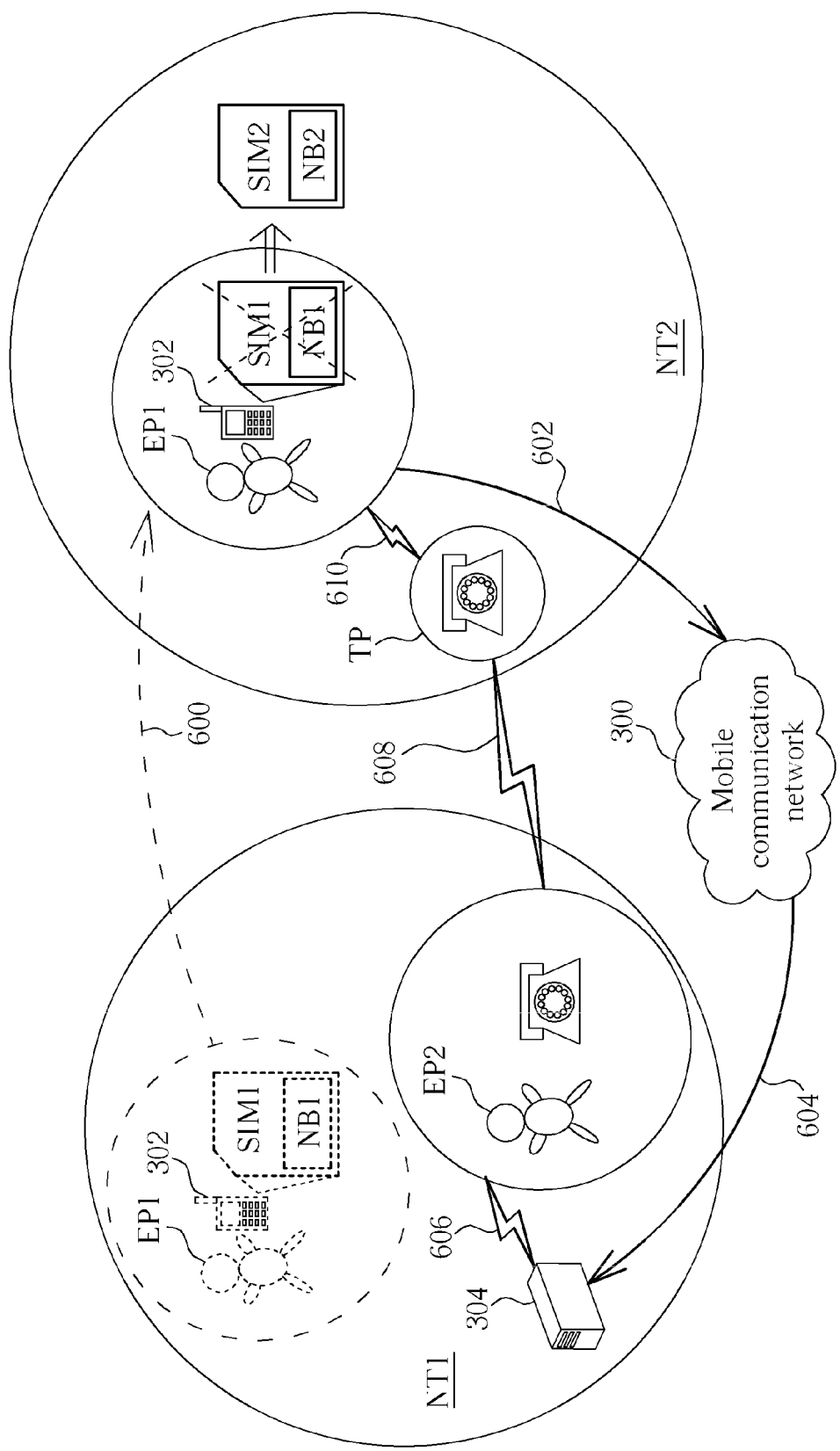
Figure 7:
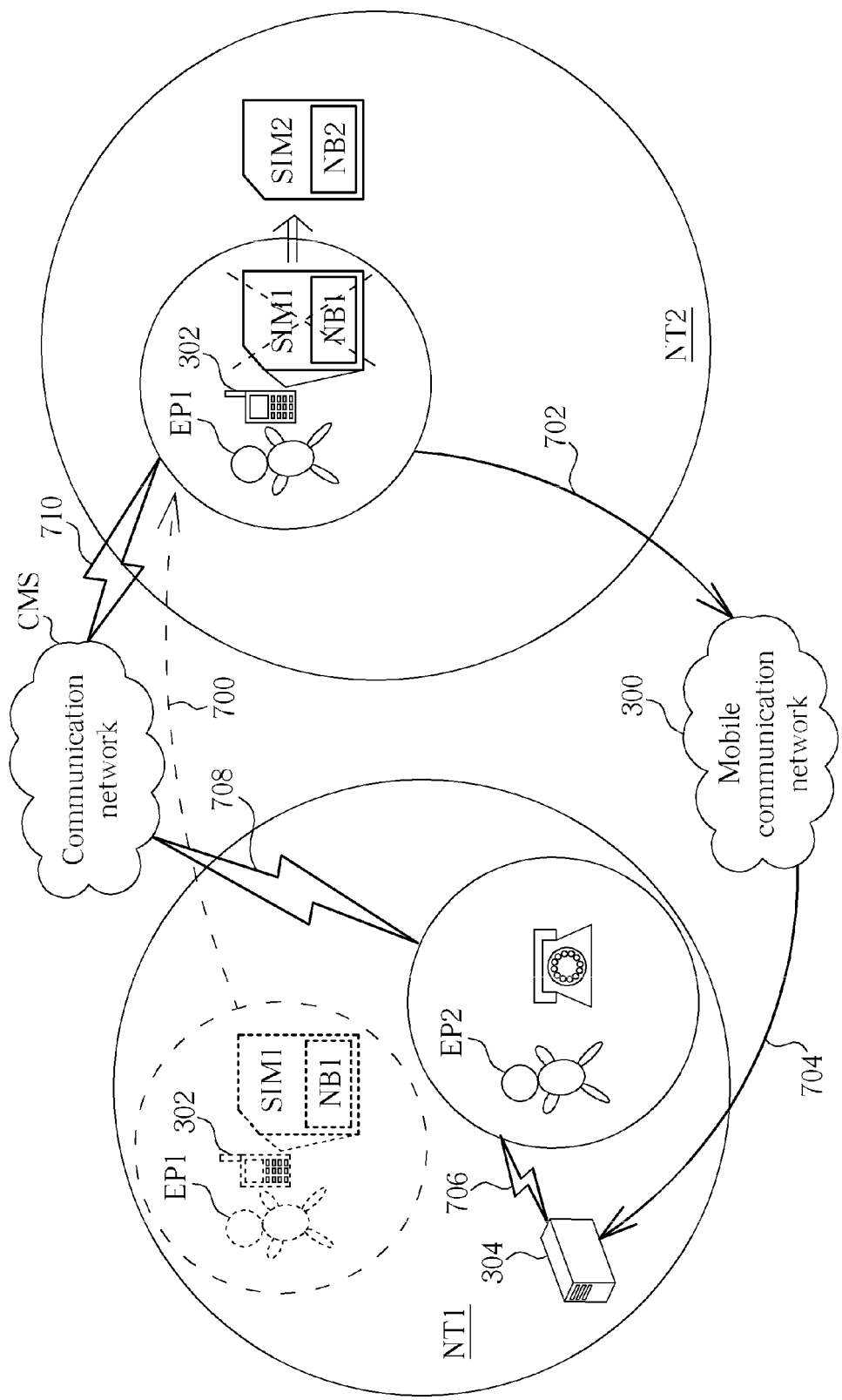

In order to clearly illustrate the present invention, the operation method of the present invention is shown in FIGS. 5, 6, and 7, which is corresponding to FIG. 1. The difference is the staff EP1 brings the mobile communication device 302 of the present invention to the location NT2, and the server device 304 of the present invention is set in the location NT1. An illustration of the present invention shown below is to explain how to improve a drawback of the prior art.

Figure 2:
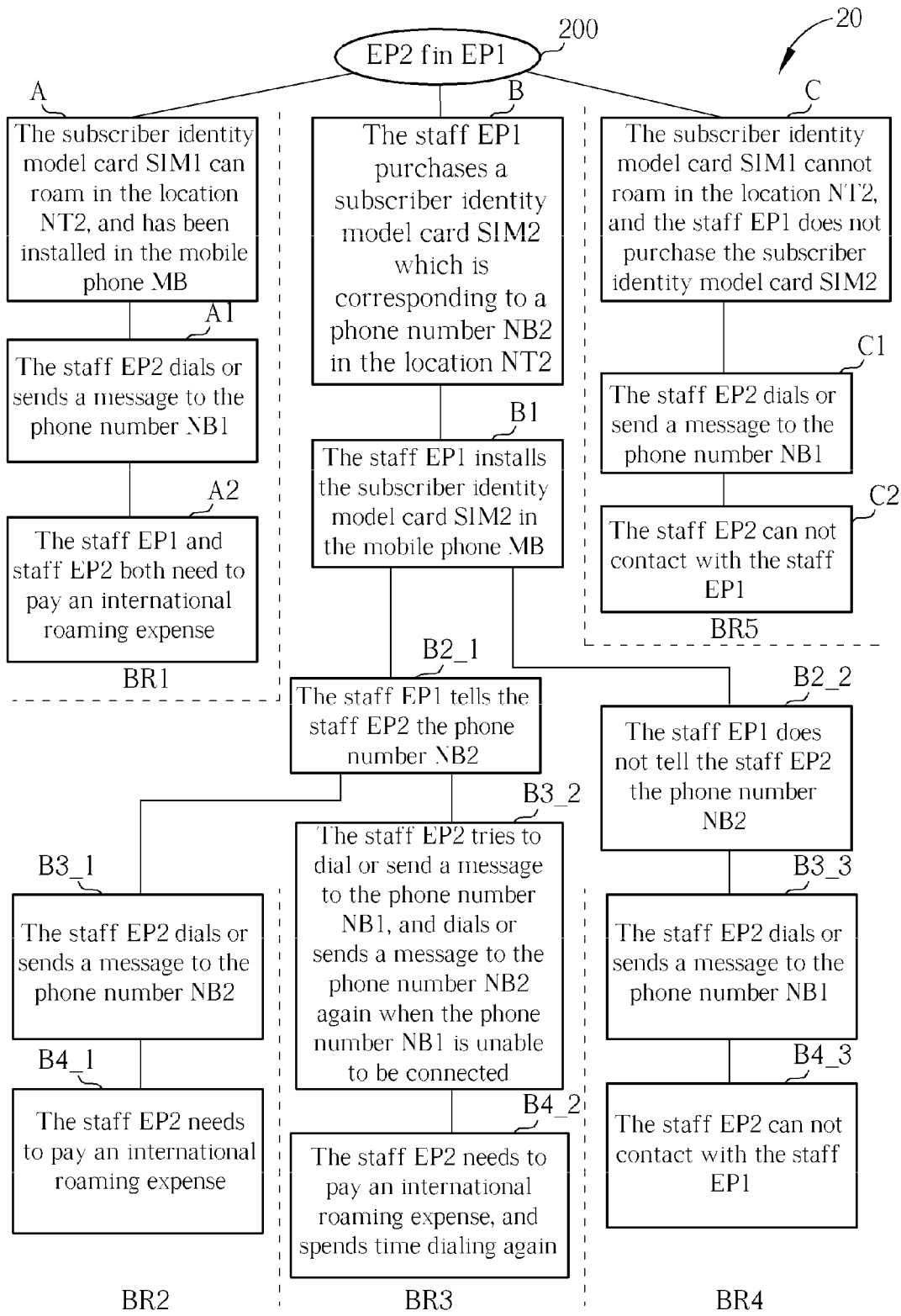
FIG. 2 is a tree diagram of connecting a staff in different situations in FIG. 1.

First, FIG. 5 is shown how to solve the drawback of the branch BR1 in FIG. 2, and realized by the following Steps 500~510 in order.

Step 500: The staff EP1 brings the mobile communication device 302 to the location NT2. The mobile communication device 302 uses the subscriber identity model card SIM1 (whose phone number is NB1), and can roam in the location NT2.

Step 502 and Step 504: The mobile communication device 302 automatically transmits the device information INFO_DEV to the server device 304 in the location NT1 through the mobile communication network 300, and the server device 304 updates the database or adjusts a related setting according to the device information INFO_DEV.

Step 506: The staff EP2 dials or sends message to the phone number NB1 or the code of the staff EP1.

Step 508 and Step 510: The server device 304 guides the communication request from the staff EP2 to the mobile communication device 302 through a transition point TP according to the device information INFO_DEV, so as to establish the communication connection for reducing the phone expense.

Therefore, as can be seen from FIG. 5, when the subscriber identity model card SIM1 can roam in the location NT2, the present invention establishes the communication connection between the staff EP2 and the staff EP1 through the transition point TP. The transition point TP is preferably an extension telephone of an enterprise intercommunicating telephone system, which means the communication connection between the staff EP2 and the transition point TP is established through an enterprise international special line. In this situation, the expense of the staff EP2 calling the staff EP1 is a first connection expense between the transition point TP and the staff EP2, and a second connection expense between transition point TP and the mobile communication device 302. Generally, the expense of calling to another extension telephone through the enterprise international special line is lower and the transition point TP and the mobile communication device 302 is not connected through the international roaming. Therefore, taking the embodiment in FIG. 5 as an example, the expense of the staff EP2 calling the staff EP1 can be reduced drastically. In addition to utilizing the transition point TP, the server device 304 can establish the communication connection through other communication networks, such as network telephone, according to the device information INFO_DEV.

In addition, FIG. 6 is shown how to solve the drawback of the branch BR2~BR4 in FIG. 2, and realized by the following Steps 600~610 in order.

Step 600: The staff EP1 brings the mobile communication device 302 to the location NT2, and the subscriber identity model card SIM2 (whose phone number is NB2) corresponding to the location NT2 is installed in the mobile communication device 302.

Step 602 and Step 604: The mobile communication device 302 automatically transmits the device information INFO_DEV to the server device 304 in the location NT1 through the mobile communication network 300, and the server device 304 updates the database or adjusts a related setting according to the device information INFO_DEV.

Step 606: The staff EP2 dials or sends message to the phone number NB1 or the code of the staff EP1.

Step 608 and Step 610: The server device 304 guides the communication request from the staff EP2 to the mobile communication device 302 through a transition point TP according the device information INFO_DEV, so as to establishing the communication connection for reducing the phone expense.

Therefore, as can be seen from FIG. 6, when the staff EP1 uses the subscriber identity model card SIM2 of a mobile phone company in the location NT2, whether the staff EP1 tells the phone number NB2 to the staff EP2 or not, the mobile communication device 302 of the present invention automatically transmits the device information INFO_DEV to the server device 304, so that the server device 304 can recognize that the mobile communication device 302 already changes the mobile phone company as well as the phone number.

Hence, the server device 304 can correctly establish the communication connection between the staff EP2 and the staff EP1 when the staff EP2 dials or sends message to the phone number NB1 or the code of the staff EP1. In this example, the server device 304 establishes communication connection with the mobile communication device 302 through the transition point TP. However, the communication connection can be established through other communication networks.

As can be seen from FIG. 6, when the staff EP1 travels to the location NT2, though the staff EP1 does not tell the staff EP2 the phone number NB2, the staff EP2 still can immediately and smoothly contact with the staff EP1 under the condition that the staff EP2 does not know the contact method of the staff EP1 because the mobile communication device 302 automatically transmits the device information INFO_DEV to the server device 304, so as to improve the drawback of the prior art.

Finally, FIG. 7 is shown how to solve the drawback of the branch BR5 in FIG. 2, and realized by the following Steps 700~710 in order.

Step 700: The staff EP1 brings the mobile communication device 302 to the location NT2, and the subscriber identity model card SIM2 cannot roam in the location NT2.

Step 702 and Step 704: The mobile communication device 302 automatically transmits the device information INFO_DEV to the server device 304 in the location NT1 through the mobile communication network 300, and the server device 304 updates the database or adjusts a related setting according to the device information INFO_DEV.

Step 706: The staff EP2 dials or sends message to the phone number NB1 or the code of the staff EP1.

Step 708 and Step 710: The server device 304 establishes the communication connection between the communication request from the staff EP2 and the mobile communication device 302 through a communication network CMS according to the device information INFO_DEV.

Therefore, as can be seen from FIG. 7, when the subscriber identity model card SIM1 cannot roam in the location NT2, the communication connection between the staff EP2 and the staff EP1 can be established though the communication network CMS. The communication network CMS can be a network phone system, which means the connection between staff EP2 and the staff EP1 is established through a network phone. In this situation, though the staff EP1 does not purchase the subscriber identity model card SIM2 and the staff EP2 does not know the contact method of the staff EP1, the staff EP2 still can immediately and smoothly contact with the staff EP1 through the communication network CMS, so as to improve the drawback of the prior art.

From above, the mobile communication device 302 of the present invention can transmit the device information INFO_DEV to the server device 304 through the mobile communication network 300, and the server device 304 establishes a proper communication connection according to the device information INFO_DEV, thereby others can immediately contact the user of the mobile communication device 302. Note that, the mobile communication device 302 in previous illustration only includes the first reception module 306 and the transmission module 308; in reality, the mobile communication device 302 can include other components for realizing a mobile communication function. The detailed description is omitted because the skill is fairly known for people in the art. Similarly, the server device 304 also includes other components for realizing a server function. In a word, the spirit of the present invention is that the mobile communication device 302 transmits the device information INFO_DEV to the server device 304, and the server device 304 can establish a proper communication connection accordingly. The embodiment of the present invention can be realized by different methods according to different goals.

In conclusion, the mobile communication device 302 of the present invention transmits the device information INFO_DEV to the server device 304 to update information, adjust a setting, and establish a proper communication connection. Therefore, besides reducing the phone expense effectively, the most important is that others can immediately and smoothly contact a user of the mobile communication device 302.

Those skilled in the art will readily observe that numerous modifications and alterations of the device and method may be made while retaining the teachings of the invention.

What is claimed is:

1. A mobile communication system comprising:
    a mobile communication device comprising:
        a first reception module for obtaining device information corresponding to the mobile communication device, wherein the first reception module of the mobile communication device starts to obtain the device information corresponding to the mobile communication device according to a schedule and/or a user control signal; and
        a transmission module for transmitting the device information via a mobile communication network during no registration process; and
    a server device comprising:
        a second reception module for receiving the device information via the mobile communication network; and
        a connection module for establishing a communication connection between the mobile communication device and a destination end according to the device information when a communication request corresponding to the mobile communication device is received from the destination end.

2. The mobile communication system of claim 1, wherein the device information comprises location information of the mobile communication device.

3. The mobile communication system of claim 2, wherein the first reception module comprises a global positioning receiver for obtaining the location information via a global positioning system.

4. The mobile communication system of claim 2, wherein the connection module comprises:
    a selection unit for selecting a nearest transition point corresponding to the mobile communication device according to the location information included in the device information; and
    a connection establishment unit for establishing a first communication connection between the transition point and the destination end, and a second communication connection between the transition point and the mobile communication device, so as to establish the communication connection between the destination end and the mobile communication device.

5. The mobile communication system of claim 1, wherein the device information comprises a phone number of the mobile communication device.

6. The mobile communication system of claim 5, wherein the server device further comprises:
    a database for storing an original phone number of the mobile communication device; and
    an update module for updating the database according to the phone number included in the device information.

7. The mobile communication system of claim 1, wherein the device information comprises information of a telecommunication service provider corresponding to the mobile communication device.

8. The mobile communication system of claim 1, wherein the transmission module comprises a comparator for comparing the device information and original device information, and transmits the device information to the server device via the mobile communication network when the device information differs from the original device information.

9. The mobile communication system of claim 8, wherein the transmission module of the mobile communication device transmits a variation between the device information and the original device information to the server device via the mobile communication network when the device information differs from the original device information.

10. A communication management method for a mobile communication system comprising a mobile communication device and a server device, the communication management method comprising:
   the mobile communication device obtaining device information corresponding to the mobile communication device, wherein the mobile communication device starts to obtain the device information corresponding to the mobile communication device according to a schedule and/or a user control signal;
   the mobile communication device transmitting the device information to the server device via a mobile communication network during no registration process; and
   establishing a communication connection between the mobile communication device and a destination end according to the device information when the server device receives a communication request corresponding to the mobile communication device from the destination end.

11. The communication management method of claim 10, wherein the device information comprises location information of the mobile communication device.

12. The communication management method of claim 11, wherein the location information is obtained by the mobile communication device via a global positioning system.

13. The communication management method of claim 11, wherein establishing the communication connection between the mobile communication device and the destination end according to the device information comprises:
   selecting a nearest transition point corresponding to the mobile communication device according to the location information included in the device information; and
   establishing a first communication connection between the transition point and the destination end, and a second communication connection between the transition point and the mobile communication device, so as to establish the communication connection between the destination end and the mobile communication device.

14. The communication management method of claim 10, wherein the device information comprises a phone number of the mobile communication device.

15. The communication management method of claim 14 further comprising the server device updating a database storing an original phone number of the mobile communication device according to the phone number included in the device information.

16. The communication management method of claim 10, wherein the device information comprises information of a telecommunication service provider corresponding to the mobile communication device.

17. The communication management method of claim 10, wherein the mobile communication device transmits the device information to the server device via the mobile communication network when the device information differs from original device information.

18. The communication management method of claim 17, wherein the mobile communication device transmits a variation between the device information and the original device information to the server device via the mobile communication network when the device information differs from the original device information.

* * * * *